(12) United States Patent
Tosato

(10) Patent No.: US 8,116,702 B2
(45) Date of Patent: Feb. 14, 2012

(54) TRANSMISSION OVER A MULTIPLE INPUT MULTIPLE OUTPUT BROADCAST CHANNEL (MIMO-BC)

(75) Inventor: Filippo Tosato, Redhill (GB)

(73) Assignees: Koninklijke Philips Electronics N.V., Eindhoven (NL); Sharp Corporation, Osaka (JP)

( * ) Notice: Subject to any disclaimer, the term of this patent is extended or adjusted under 35 U.S.C. 154(b) by 1016 days.

(21) Appl. No.: 11/994,665

(22) PCT Filed: Jul. 6, 2006

(86) PCT No.: PCT/IB2006/052284
§ 371 (c)(1),
(2), (4) Date: Jan. 4, 2008

(87) PCT Pub. No.: WO2007/007249
PCT Pub. Date: Jan. 18, 2007

(65) Prior Publication Data
US 2008/0207238 A1    Aug. 28, 2008

(30) Foreign Application Priority Data

Jul. 8, 2005  (EP) ..................................... 05106253
Sep. 28, 2005  (GB) ..................................... 0519749.6

(51) Int. Cl.
*H03C 1/62* (2006.01)
*H04B 1/04* (2006.01)

(52) U.S. Cl. ................ 455/115.1; 455/67.11; 455/114.2; 375/296

(58) Field of Classification Search ................. 455/67.11, 455/114.2, 114.3, 115.1, 500, 560, 561; 375/295, 375/296

See application file for complete search history.

(56) References Cited

U.S. PATENT DOCUMENTS 6,870,882 B1 * 3/2005 Al-Dhahir et al. ............ 375/233
(Continued)

OTHER PUBLICATIONS

B. Hochwald et al., "A Vector-Perturbation Technique for Near-Capacity Multiantenna Multiuser Communication—Part 1: Channel Inversion and Regularization", IEEE Transactions on Communications, IEEE Service Center, Piscataway, NJ, vol. 53, No. 1, Jan. 2005, pp. 195-202, XO011126608P.

(Continued)

*Primary Examiner* — Quochien B Vuong

(57) ABSTRACT

A Multiple Input Multiple Output (MIMO) communication system 1 has a transmitter for transmitting signals over a MIMO Broadcast Channel (MIMO-BC) 6. Data for communication to respective receivers $4_1$, $4_{K-1}$, $4_K$ is encoded by encoding stages $10_1$, ..., $10_{K-1}$, $10_K$ in a selected order by selecting codewords $c_1$, ... $c_{K-1}$, $c_K$ from codebooks $C_1$, ... $C_{K-1}$, $C_K$ of a nested lattice code. Dither adders $11_1$, ..., $11_{K-1}$, $11_K$ are arranged to add a respective dither $d_1$ ..., $d_{K-1}$, $d_k$ to the selected codewords $c_1$, ... $c_{K-1}$, $c_K$. Quantising stages $12_1$, ..., $12_{K-1}$, $12_K$ each perform respective quantising operations mod $\Lambda_{S,1}$, ..., mod $\Lambda_{S,K-1}$, mod $\Lambda_{S,K}$ using the shaping lattice $\Lambda_S$ of the nested lattice code. Quantised signals $u_1$, ..., $u_{K-1}$, $u_K$ of data encoded earlier in the selected order are output to feedbackward filter stages $14_1$, ..., $14_{K-1}$ for filtering the codewords $c_1$, ... $c_{K-1}$, $c_K$ of data encoded later in the selected order before they are quantised by the quantising stages $12_1$, ..., $12_{K-1}$ using a feedbackward filter $F_b$. At the receivers $4_1$, $4_{K-1}$, $4_K$ feedforward filter stages $15_1$, ..., $15_{K-1}$, $15_K$ filter received signals $y_1$, ..., $y_{K-1}$, $y_K$ by applying a feedforward filter $F_f$. A combination of the feedbackward and feedforward filters $F_b$, $F_f$ is substantially equivalent to a single filter for extracting the signals representing the data intended to be communicated to the receivers $4_1$, $4_{K-1}$, $4_K$ with a minimum mean squared error, but the feedforward filter $F_f$ can be applied by each of the receivers $4_1$, ..., $4_{K-1}$, $4_K$ without knowledge of signals $y_1$, ..., $y_{K-1}$, $y_K$ received by the other receivers $4_1$, ..., $4_{K-1}$, $4_K$.

30 Claims, 4 Drawing Sheets

U.S. PATENT DOCUMENTS

| | | | |
|---|---|---|---|
| 7,197,084 B2 * | 3/2007 | Ketchum et al. | 375/296 |
| 7,415,086 B2 * | 8/2008 | Djokovic et al. | 375/350 |
| 7,561,633 B2 * | 7/2009 | Parhi et al. | 375/267 |
| 2003/0185310 A1 | 10/2003 | Ketchum | |
| 2005/0043031 A1 * | 2/2005 | Cho et al. | 455/450 |

OTHER PUBLICATIONS

B. Hochwald et al., "A Vector-Perturbation Technique for Near-Capacity Multiantenna Multiuser Communication—Part 2: Perturbation", IEEE Transactions on Communications, IEEE Service Center, Piscataway, NJ, vol. 53, No. 3, Mar. 2005, pp. 537-544, XP011129570.

R. Wesel et al., :Achievable Rates for Tomlinson-Harashima Precoding, IEEE Trans. Theory, 44, pp. 825-831, Sep. 1998.

G. Caire et al., "On the Achievable Throughput of a Multuantenna Gaussuan Broadcast Channel", IEEE Trans. Inform. Theory, 49, pp. 1691-1706, Jul. 2003.

R. Zamir et al., "Nested Linear/Lattice Codes for Structured Multi-Terminal Binning", IEEE Trans. Inform. Theory, pp. 1250-1276, Jun. 2002.

W. Yu et al., "Uplink-Downlink Duality Via Minimax Duality", IEEEE trans. Inform. Theory, vol. 52, No. 2, pp. 361-374, Feb. 2006.

D. Bertsekas, "Nonlinear Programming", Athena Scientific, Belmont, Massachusetts, 1995.

N. Jindal et al., "Sum Power Iterative Water-Filling for Multi-Antenna Gaussian Broadcast Channels", IEEE Trans, Inform. Theory, 51(4), pp. 1570-1580, Apr. 2005.

F. Tosato, "Achieving the Sum-Rate capacity of the MIMO Broadcast Channel with Veroni Codes and MMSE-GDFE Estimation", Proc. 42nd Annu. Allerton Conf. on Communication, Control and Computing, Allerton House, Monticello, IL, Sep. 2005.

\* cited by examiner

TRANSMISSION OVER A MULTIPLE INPUT MULTIPLE OUTPUT BROADCAST CHANNEL (MIMO-BC)

This invention relates to a transmitter having multiple antennas for transmission over a communication channel to receivers each having one or more antennas and to a method of transmission over such a communication channel, typically referred to as a Multiple Input Multiple Output Broadcast Channel (MIMO-BC).

MIMO-BCs are presently suggested for a number of emerging wireless and wired communication technologies, including downlink channels in cellular telecommunications, wireless Local Area Network (LAN) and x Digital Subscriber Line (xDSL) systems. Signals are transmitted from a transmitter having multiple transmit antennas over the MIMO-BC simultaneously to receivers each having one or more receive antennas. The receivers are unable to cooperate with one another, which means that they must extract their wanted signal or signals from the signals received at their receive antenna or antennas without any direct knowledge of the signals received at the receive antennas of the other receivers. This is not straightforward and schemes are sought that can allow the receivers to extract their wanted signal or signals successfully yet attain maximum transmission capacity over the MIMO-BC.

Most suggested schemes involve precoding the signals at the transmitter before transmission and allocating powers at which the signals are combined at each of the transmit antennas of the transmitter for transmission over the channel. The precoding can be linear, in the sense that it is determined in advance of application to a set of signals to be simultaneously transmitted; or non-linear, in the sense that it is applied to signals of the set of signals to be simultaneously transmitted independently and the application of the precoding to some of the signals can depend on others of the signals to which the precoding has already been applied. A non-linear precoding technique known as generalised Tomlinson-Harashima precoding (THP) is proposed, for example, in the paper "Achievable rates for Tomlinson-Harashima Precoding" Wesel, R. et al, IEEE Trans. Inform. Theory, 44, pages 825-831, September 1998. Another non-linear precoding technique known as ranked-known interference (RKI) is proposed, for example, in the paper "On the Achievable Throughput of a Multiantenna Gaussian Broadcast Channel", Caire, G. et al, IEEE Trans. Inform. Theory, 49, pages 1691-1706, July 2003. Yet another non-linear preceding technique known as vector precoding is proposed in the papers "A Vector-Perturbation Technique for Near-Capacity Multiantenna Multiuser Communication—Part I: Channel Inversion and Regularization", Peel, C. et al, IEEE Trans. Commun., 53(1), pages 195-202, January 2005 and "A Vector-Perturbation Technique for Near-Capacity Multiantenna Multiuser Communication—Part II: Perturbation", Peel, C., IEEE Trans. Commun., 53(3), pages 537-544, March 2005. However, all of these schemes are heuristic and fail to achieve the maximum theoretical sum-rate capacity of the MIMO-BC channel. The potential capacity of the MIMO-BC channel is not therefore fully exploited.

The present invention seeks to overcome this problem.

According to the present invention, there is provided a transmitter having multiple transmit antennas for transmission over a communication channel to receivers each having one or more receive antennas, the transmitter comprising:

means for estimating channel conditions for the channel;
a feedbackward filter for filtering signals representing data intended to be communicated to respective receive antennas before transmission over the channel to compensate for expected co-signal interference in the channel;
means for allocating powers at which the filtered signals are combined at each transmit antenna for transmission over the channel;
means for transmitting information representing a feedforward filter to one of the receivers for application to a signal received over the channel at a receive antennas of that receiver to extract from the received signal a signal representing the data intended to be communicated to that receive antenna without knowledge of the signal or signals received over the channel at the receive antenna(s) of the other receiver(s); and
means for determining the feedbackward filter, power allocation and feedforward filter based on the estimated channel conditions for the channel.

According to a second aspect of the present invention, there is provided a method of transmission over a communication channel from a transmitter having multiple transmit antennas to receivers each having one or more receive antennas, the method comprising:

estimating channel conditions for the channel;
filtering signals representing data intended to be communicated to respective receive antennas with a feedbackward filter before transmission over the channel to compensate for expected co-signal interference in the channel;
allocating powers at which the filtered signals are combined at each transmit antenna for transmission over the channel;
transmitting information representing a feedforward filter to one of the receivers for application to a signal received over the channel at a receive antennas of that receiver to extract from the received signal a signal representing the data intended to be communicated to that receive antenna without knowledge of the signal or signals received over the channel at the receive antenna(s) of the other receiver(s); and
determining the feedbackward filter, power allocation and feedforward filter based on the estimated channel conditions for the channel.

So, the feedbackward and feedforward filters can be used at the transmitter and receiver respectively. The combination of these filters, with appropriate filter coefficients, allows the capacity of the channel substantially to reach the theoretical maximum achievable sum-rate capacity of the channel, but importantly still permits the receiver to extract its wanted signal independently of the other receivers, as the feedforward filter need not contain filter coefficients relating to signals received by the other receivers. In order to try to reach the theoretical maximum achievable sum-rate capacity of the channel, a combination of the feedbackward and feedforward filters should ideally be substantially equivalent to a single filter for extracting the signal representing the data intended to be communicated to the receiver with a minimum mean squared error under the estimated channel conditions.

The channel conditions for the channel can be estimated in a variety of ways. For example, the transmitter may comprise means for transmitting a pilot sequence to the receivers and means for receiving an indication of the channel conditions for the channel from the receivers based on the pilot bits. This allows the means for estimating the channel conditions for the channel to base the estimate on the received indication. Alternatively, the means for estimating the channel conditions can estimate the channel conditions to be the channel conditions of a return channel from the receive antennas of the receivers to the transmit antennas of the transmitter. So, the means for estimating the channel conditions may comprise means for estimating the channel conditions of the return channel. In any case, the estimated channel conditions may be the channel fading conditions, e.g. the fading conditions over the channel, or some other indication of channel quality.

The feedbackward filter, power allocation and feedforward filter are usually based on a solution to an optimisation problem, such as a min-max problem or such like. In one example, the optimisation problem may be an optimisation problem for maximising the overall capacity of the channel under the estimated channel conditions for a given total power constraint. In another example, the optimisation problem may be for maximising the overall capacity of the return channel. This return channel can be considered to be dual to the channel over which the signals are transmitted from the transmitter to the receivers. The optimisation problem for the return channel can often be easier to solve than the optimisation problem for the channel over which the signals are transmitted from the transmitter to the receivers.

In some implementations, it might be possible for the means for determining the feedbackward filter, power allocation and feedforward filter to select the feedbackward filter, power allocation and feedforward filter from stored feedbackward filters, power allocations and feedforward filters. However, more usually, the means for determining the feedbackward filter, power allocation and feedforward filter determines the feedbackward filter, power allocation and feedforward filter by solving the optimisation problem. In a particular example, the means for determining the feedbackward filter, power allocation and feedforward filter derives an input covariance and least favourable noise covariance for the channel based on the solved input optimisation problem. Least favourable noise covariance can alternatively be referred to as "worst case" noise covariance and might be least favourable "Sato" noise covariance or any other suitable representation. The means for determining the feedbackward filter, power allocation and feedforward filter may also derive an estimation filter that can be factorised to provide the feedbackward filter and feedforward filter.

The feedbackward filter, power allocation and feedforward filter generally each comprise a set of coefficients. These can be arranged in matrix form. One preferred property of the feedbackward filter is that it can be arranged as a uni-triangular matrix with respect to a column of signals representing the data to be communicated to the respective receive antennas. One preferred property of the feedforward filter is that it can be arranged as a block diagonal matrix with respect to a column representing the signal received by the one receiver. It is also preferred that the feedbackward filter, power allocation and feedforward filter can each be applied to blocks of symbols of the signals on a block by block basis.

The transmitter usually has an encoder for encoding the data intended to be communicated to the receive antennas to output the signals for filtering by the feedbackward filter. Preferably, the encoder encodes the data by selecting a codeword of a nested lattice code. In this case, the transmitter may also have a quantisation stage for quantising the codewords of the encoded signals using a shaping lattice of the nested lattice code. The transmitter may also have means for applying dither to the codewords of the encoded signals. These features have been found to provide an efficient transmission scheme.

It is preferred that the encoder encodes the signals in a selected order. This allows the feedbackward filter to be applied to the signals successively. For example, signals encoded earlier in the order can each be subtracted from a given encoded signal and the feedbackward filter can be applied to the earlier encoded signals before each subtraction. This is referred to as a non-linear scheme. On the other hand, this is not necessary. In a linear scheme, the feedbackward filter and power allocation may comprise a single preceding filter. This preceding filter can be a normalisation of the feedbackward filter to a total power of the transmit antennas.

So, it can be useful for the transmitter to have means for choosing an/the order in which to encode signals to be communicated to the receive antennas. Indeed, as there are often more receive antennas than transmit antennas, the transmitter may have a selector for selecting receive antennas to which to communicate signals. Preferably, the selector optimises sum rate capacity of a/the return channel from the receive antennas to the transmit antennas, identifies receive antennas to which substantially zero capacity is allocated in the return channel as a result of the optimisation; and selects to transmit signals over the communication channel from the transmit antennas to the receive antennas only to receive antennas that are not identified as allocated substantially zero capacity in the return channel. This is considered new in itself and, according to a third aspect of the present invention, there is provided a transmitter having multiple transmit antennas for transmission over a communication channel to receivers each having one or more receive antennas, the transmitter having a selector for optimising sum rate capacity of a/the return channel from the receive antennas to the transmit antennas, identifying receive antennas to which substantially zero capacity is allocated in the return channel as a result of the optimisation; and selecting to transmit signals over the communication channel from the transmit antennas to the receive antennas only to receive antennas that are not identified as allocated substantially zero capacity in the return channel.

The selector can alter the optimisation to exclude one or more receive antennas. It can also scale values in a representation of the channel fading conditions used in the optimisation for one or more receive antennas to reduce the probability it/they are selected for transmission of signals over the communication channel from the transmit antennas to the receive antennas and/or normalise a representation of the channel fading conditions used in the optimisation.

Use of the terms "means", "filter", "encoder" and so on is intended to be general rather than specific. The invention may be implemented using such separate components. However, it may equally be implemented using individual processor, such as a digital signal processor (DSP) or central processing unit (CPU). Similarly, the invention could be implemented using a hard-wired circuit or circuits, such as an application-specific integrated circuit (ASIC), or by embedded software. Indeed, it can also be appreciated that the invention can be implemented using computer program code. According to a further aspect of the present invention, there is therefore provided computer software or computer program code adapted to carry out the method described above when processed by a processing means. The computer software or computer program code can be carried by a computer readable medium. The medium may be a physical storage medium such as a Read Only Memory (ROM) chip. Alternatively, it may be a disk such as a Digital Versatile Disk (DVD-ROM) or Compact Disk (CD-ROM). It could also be a signal such as an electronic signal over wires, an optical signal or a radio signal such as to a satellite or the like. The invention also extends to a processor running the software or code, e.g. a computer configured to carry out the method described above.

Preferred embodiments of the invention will now be described with reference to the accompanying drawings, in which.

Figure 4:
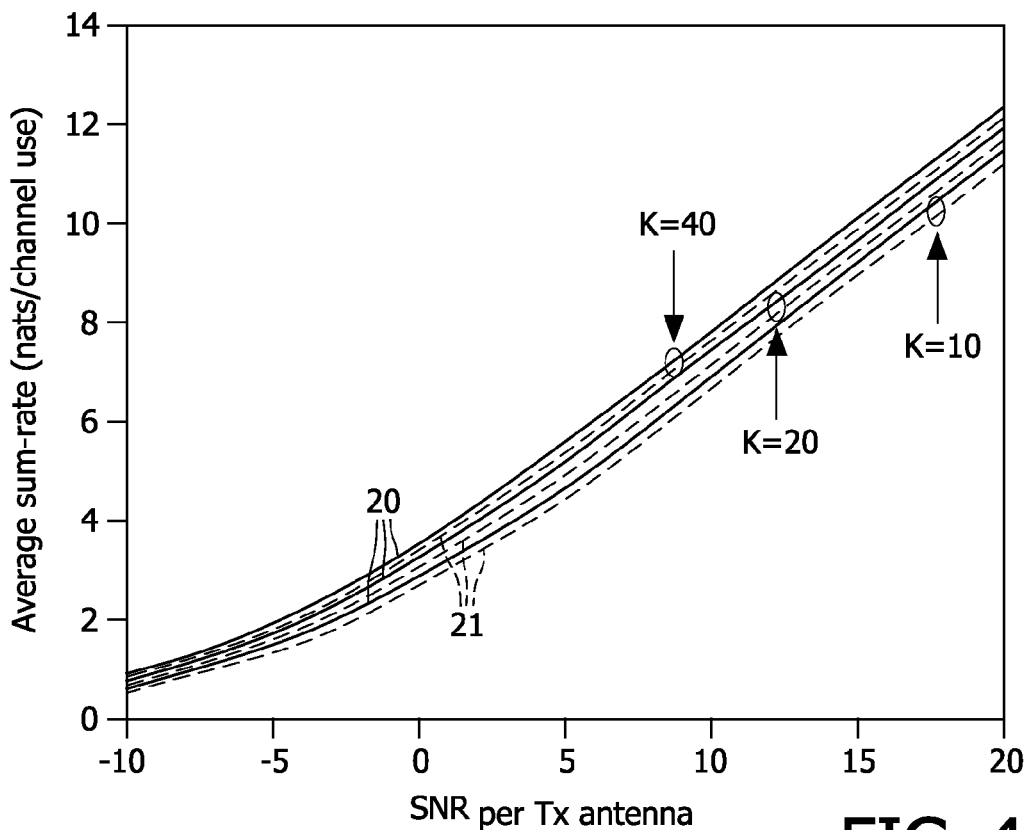
Figure 5:
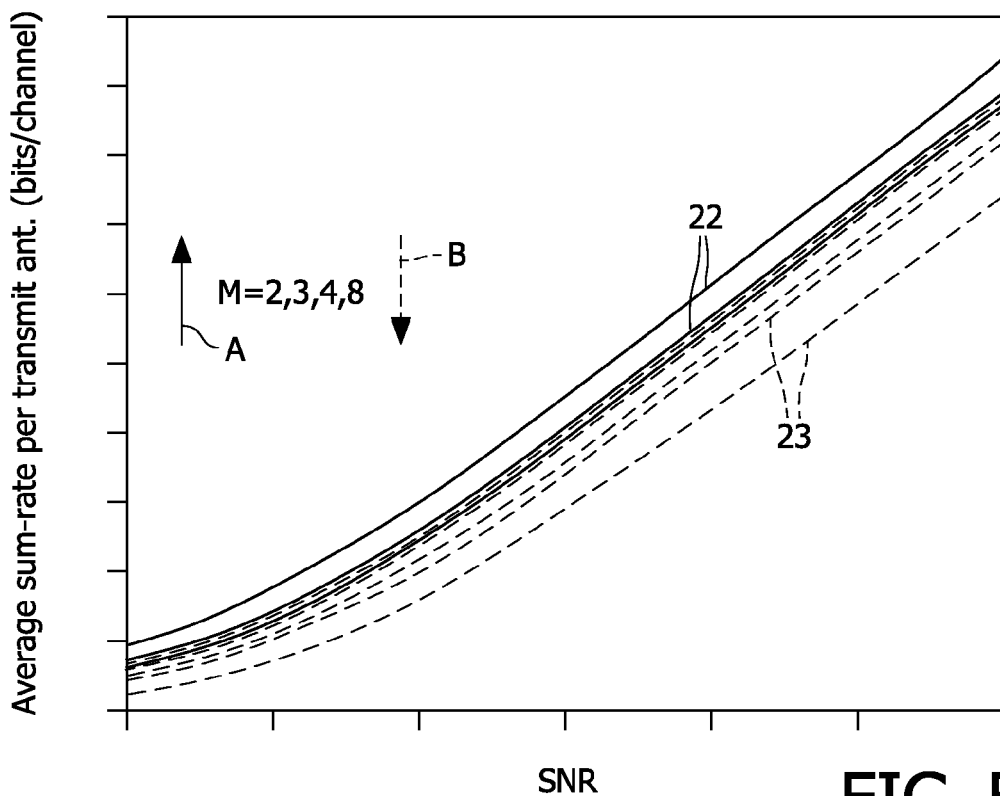

FIG. 4 is a graphical representation of sum-rate channel capacity versus channel noise for transmission over the MIMO-BCs in accordance with the first and second embodiments of the invention; and FIG. 5 is a graphical representation of the sum-rate capacity divided by the number of transmit antennas for transmission over the MIMO-BCs in accordance with the first and second embodiments of the invention.

Figure 1:
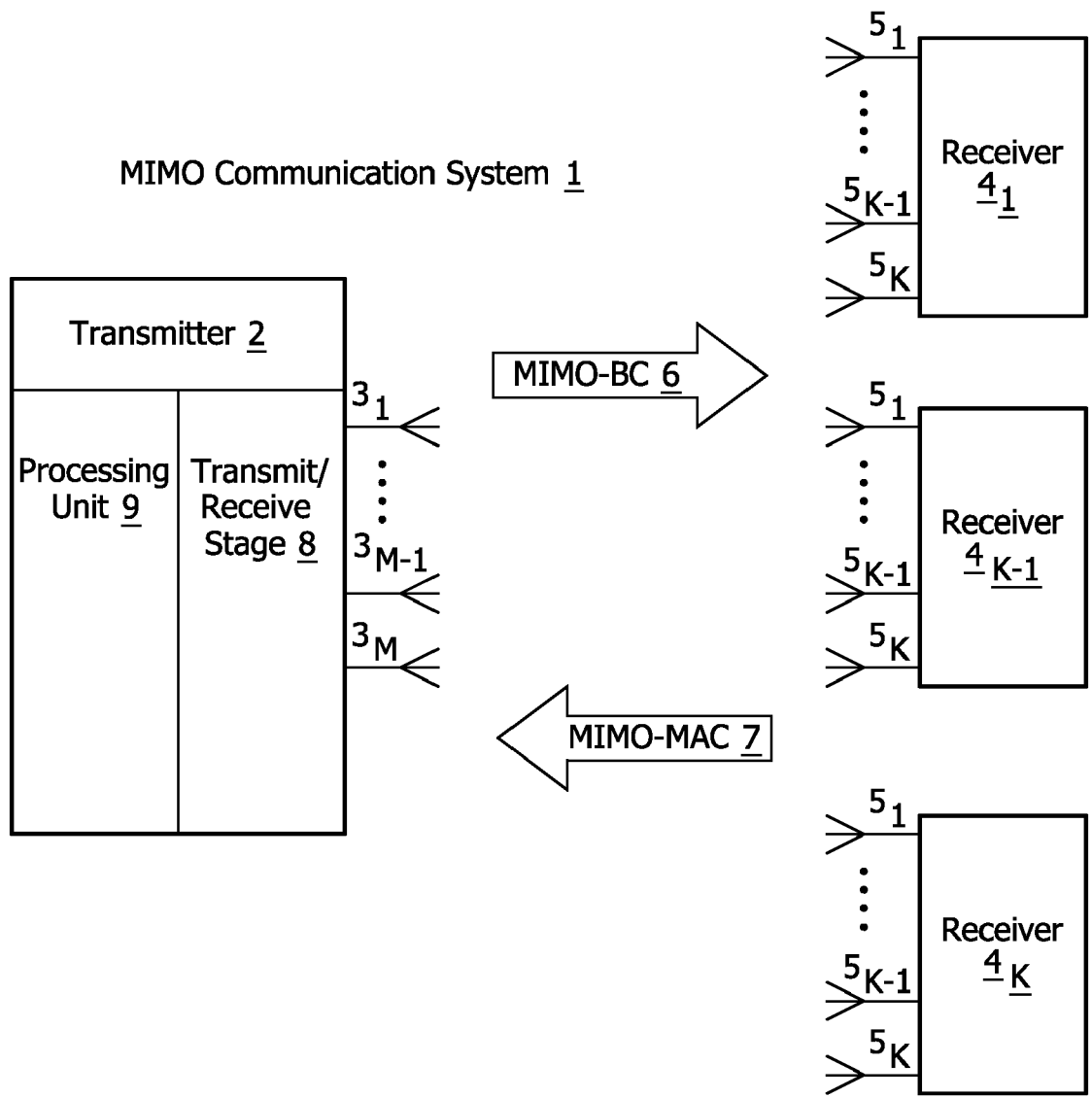
FIG. 1 is a schematic illustration of a Multiple Input Multiple Output (MIMO) communication system.

Referring to FIG. 1, a Multiple Input Multiple Output (MIMO) communication system 1 comprises a transmitter 2, having M transmit antennas $3_1, \ldots, 3_{M-1}, 3_M$, that communicates with K receivers $4_1, \ldots, 4_{K-1}, 4_K$, each having a set of receive antennas $5_{1,1}, 5_{1, N-1}, 5_{1, N}, \ldots, 5_{K, N}$, via a MIMO Broadcast Channel (MIMO-BC) 6. The receivers $4_1, \ldots, 4_{K-1}, 4_K$ also communicate with the transmitter 2 over a MIMO Multiple Access Channel (MIMO-MAC) 7. The MIMO-BC 6 forms a downlink and the MIMO-MAC 7 forms an uplink. The transmitter 2 has a transmit/receive stage 8 for transmitting and receiving signals over the MIMO-BC 6 and MIMO-MAC 7 and a processing unit 9 for controlling the transmit/receive stage 8 and performing certain processing tasks.

Figure 2:
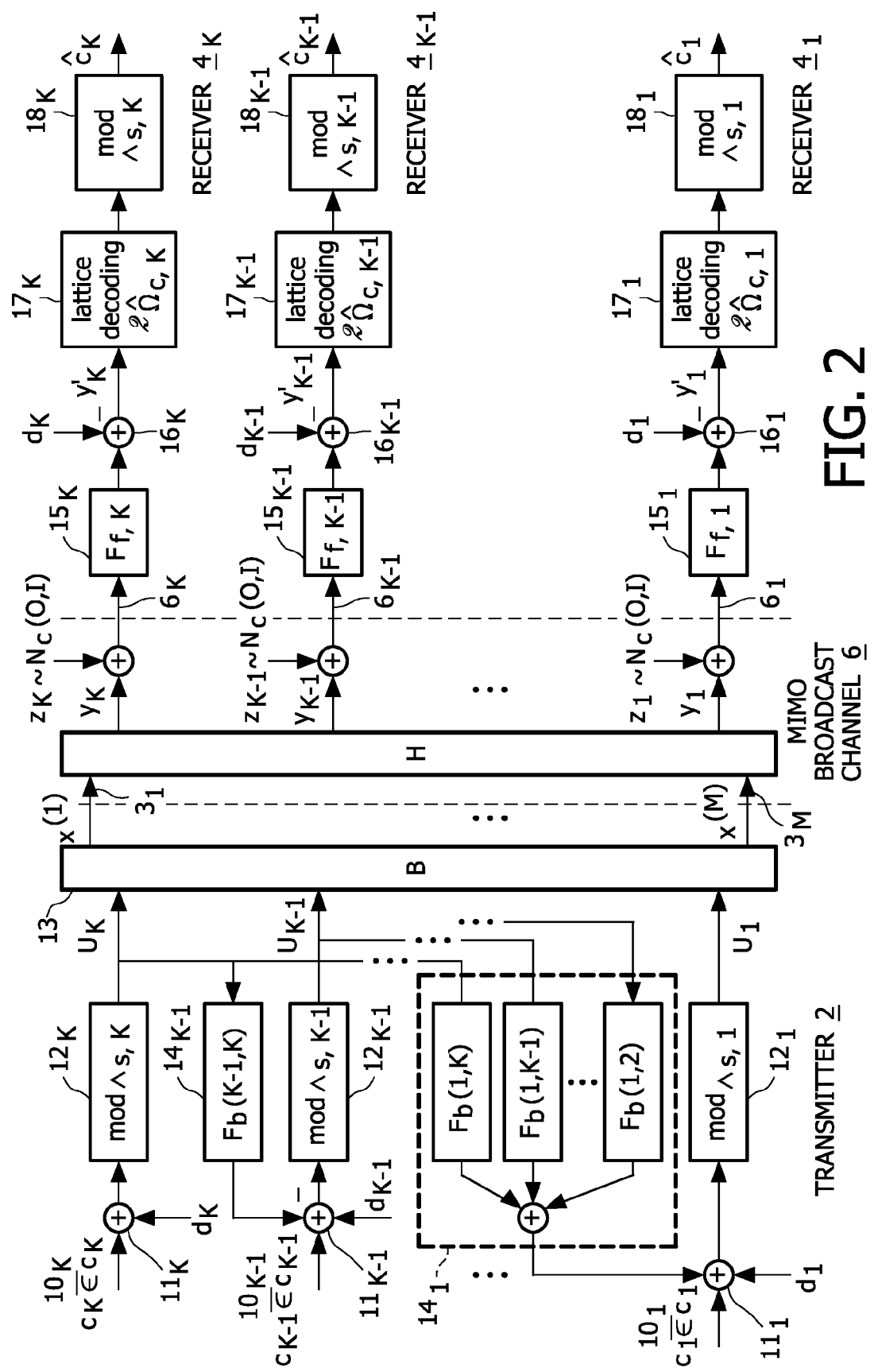
FIG. 2 is a schematic illustration of transmission over a MIMO Broadcast Channel (MIMO-BC) of the communication system illustrated in FIG. 1 in accordance with a first embodiment of the present invention.

Transmission over the MIMO-BC is illustrated in FIG. 2, which shows transmission components of the transmitter 2, or more specifically the transmit/receive stage 8 of the transmitter 2, the MIMO-BC 6 and receive components of the receivers $4_1, \ldots, 4_{K-1}, 4_K$. First, the processing unit 9 of the transmitter selects receivers $4_1, \ldots, 4_{K-1}, 4_K$ to which to transmit data and an order in which to encode the data intended to be communicated to the respective receivers $4_1, \ldots, 4_{K-1}, 4_K$. In this embodiment, the selection is achieved by the processing unit 9 optimising the sum rate capacity of the MIMO-MAC 7, using any of a variety of methods, e.g. as described in the prior art. It can then identify receivers $4_1, \ldots, 4_{K-1}, 4_K$ to which substantially zero capacity is allocated in the MIMO-MAC 7 as a result of the optimisation and select to transmit signals over the MIMO-BC 6 only to receivers $4_1, \ldots, 4_{K-1}, 4_K$ that are not identified as allocated substantially zero capacity in the MIMO-MAC 7. The processing unit 9 can alter the optimisation to exclude one or more receivers $4_1, \ldots, 4_{K-1}, 4_K$, e.g. that it is otherwise desired to omit from transmission over the MIMO-BC 6. It can also scale values in a representation of the channel fading conditions used in the optimisation for one or more receivers $4_1, \ldots, 4_{K-1}, 4_K$ to reduce the probability it/they are selected for transmission of signals over the MIMO-BC 6 and/or normalise a representation of the channel fading conditions used in the optimisation.

The transmitter 2 has encoding stages $10_1, \ldots, 10_{K-1}, 10_K$ for selecting codewords $c_1, \ldots c_{K-1}, c_K$ for data intended to be communicated to each of the receivers $4_1, \ldots, 4_{K-1}, 4_K$ from codebooks $C_1, \ldots C_{K-1}, C_K$ of a nested lattice code. Nested lattice codes, sometimes referred to as Voronoi codes, are described in detail in the paper "Nested Linear/Lattice Codes For Structured Multi-Terminal Binning", Zamir, R. et al, IEEE Trans. Inform. Theory, pages 1250-1276, June 2002. Briefly, the nested lattice code comprises a generic coding lattice $\Lambda_C$ (or fine lattice) and a shaping lattice $\Lambda_S$ (or coarse lattice). A generic codebook C of the nested lattice code can be defined by $C=\Lambda_C \cap V_S$ where $V_S$ is a fundamental region of the generic shaping lattice $\Lambda_S$ and a generic quantising opera-
tion mod $\Lambda_s$ that effectively translates a generic codeword c of the generic codebook C to a shaping region $V_S$ of the nested lattice can be defined by mod $\Lambda_s = 1 - Q_{V_s}$ where $Q_{V_s}$ denotes the nearest neighbour vector quantisation in the shaping lattice $\Lambda_S$.

At outputs of the encoding stages $10_1, \ldots, 10_{K-1}, 10_K$, dither adders $11_1, \ldots, 11_{K-1}, 11_K$ are arranged to add a respective dither $d_1, \ldots, d_{K-1}, d_k$ to the codewords $c_1, \ldots c_{K-1}, c_K$. The dithered codewords $c_1, \ldots c_{K-1}, c_K$, which continue to be referred to with the same symbols here for simplicity, are output by the dither adders $11_1, \ldots, 11_{K-1}, 11_K$ to quantising stages $12_1, \ldots, 12_{K-1}, 12_K$, which each perform respective quantising operations mod $\Lambda_{S,1}, \ldots,$ mod $\Lambda_{S,K-1},$ mod $\Lambda_{S,K}$ on the dithered codewords $c_1, \ldots c_{K-1}, c_K$ using the shaping lattice $\Lambda_S$ of the nested lattice code to convert the dithered codewords $c_1, \ldots c_{K-1}, c_K$ to quantised signals $u_1, \ldots, u_{K-1}, u_K$.

The quantised signals $u_1, \ldots, u_{K-1}, u_K$ are output by the quantising stages $12_1, \ldots, 12_{K-1}, 12_K$ to a beamforming stage 13 for allocating powers at which the quantised signals $u_1, \ldots, u_{K-1}, u_K$ are combined at each transmit antenna $3_1, \ldots, 3_{M-1}, 3_M$ of the transmitter 2 for transmission over the MIMO-BC 6 using a beamforming filter B, in the form of a matrix. The quantised signals $u_1, \ldots, u_{K-1}, u_K$ are also output by quantising stages $12_1, \ldots, 12_{K-1}, 12_K$ to feedbackward filter stages $14_1, \ldots, 14_{K-1}$ for filtering all but one of the codewords $c_1, \ldots c_{K-1}, c_K$ before they are quantised by all but one of the quantising stages $12_1, \ldots, 12_{K-1}$. In more detail, the codewords $c_1, \ldots c_{K-1}, c_K$ are quantised by the quantising stages $12_1, \ldots, 12_{K-1}$ in an order of descending number K. A first codeword $c_K$ is first quantised by a first quantising stage $9_K$ to produce first quantised signal $u_K$. The first quantised signal $u_K$ is passed to a feedbackward filter stage $14_{K-1}$ for a second codeword $c_{K-1}$. The feedbackward filter stage $14_{K-1}$ for a second codeword $c_{K-1}$ applies a feedbackward filter $F_b$ to the first quantised signal $u_K$. More specifically, feedbackward filter stage $14_{K-1}$ applies feedbackward filter coefficients $F_{b(K,K-1)}$ of the feedbackward filter $F_b$ to the first quantised signal $u_K$. The filtered first quantised signal $u_K$ is then subtracted from the second codeword $c_{K-1}$ by the dither adder $11_{K-1}$ before the second dithered codeword $c_{K-1}$ is quantised by a second quantising block $9_{K-1}$ to produce second quantised signal $u_{K-1}$. Both the first quantised signal $u_K$ and the second quantised signal $u_{K-1}$ are then passed to a feedbackward filter stage $14_1$ for a succeeding codeword $c_1$ (which in this example is the last codeword). The feedbackward filter stage $14_1$ for the succeeding codeword $c_1$ applies feedbackward filter coefficients $F_{b(1,K)}, F_{b(1,K-1)}, \ldots, F_{b(1,2)}$ of the feedbackward filter $F_b$ to the previously quantised signals $u_K, u_{K-1}, \ldots, u_2$ respectively. The filtered previously quantised signals $u_K, u_{K-1}, \ldots, u_2$ are then subtracted from the succeeding codeword $c_1$ by the dither adder $11_1$ before the succeeding dithered codeword $c_1$ is quantised by a succeeding quantising stage $12_1$. This non-linear application of the feedback filter $F_b$ compensates for expected co-signal interference in the MIMO-BC 6, as described in more detail below.

After the beamforming stage 13 allocates powers at which the quantised signals $u_1, \ldots, u_{K-1}, u_K$ are combined at each transmit antenna $3_1, \ldots, 3_{M-1}, 3_M$ of the transmitter 2, the combined signals are transmitted by the antennas $3_1, \ldots, 3_{M-1}, 3_M$ over the MIMO-BC 6. In general, signals $x_1, \ldots, x_{K-1}, x_K$ transmitted at each respective transmit antenna $3_1, 3_{M-1}, 3_M$ all include each quantised signal $u_1, \ldots, u_{K-1}, u_K$ at a power allocated by the beamforming matrix B. The signals actually received at each set of receive antennas $5_{1,1}, 5_{1, N-1}, 5_{1, N}, \ldots, 5_{K, N}$ are represented as received signals $y_1, \ldots, y_{K-1}, y_K$. The transmitted signals $x_1, \ldots, x_{K-1}, x_K$ are affected by noise in the MIMO-BC 6 and this is represented as noise signals $z_1, \ldots, z_{K-1}, z_K$ added to each of the received signals $y_1, \ldots, y_{K-1}, y_K$.

At the receivers $4_1, \ldots, 4_{K-1}, 4_K$, the received signals $y_1, \ldots, y_{K-1}, y_K$, with the added noise $z_1, \ldots, z_{K-1}, z_K$ signals, are output from the sets of receive antennas $5_{1,1}, 5_{1, N-1}, 5_{1, N}, \ldots, 5_{K, N}$ to feedforward filter stages $15_1, \ldots, 15_{K-1}, 15_K$. The feedforward filter stages $15_1, \ldots, 15_{K-1}, 15_K$ apply a feedforward filter $F_f$ to the received signals $y_1, \ldots, y_{K-1}, y_K$. More specifically, each of the feedforward filter stages $15_1, \ldots, 15_{K-1}, 15_K$ applies a respective feedforward filter coefficient $F_{f,1}, \ldots, F_{f,K-1}, F_{f,K}$ of the feedforward filter $F_f$ to the respective received signals $y_1, \ldots, y_{K-1}, y_K$ to output filtered received signals $y'_1, \ldots, y'_{K-1}, y'_K$. The filtered received signals $y'_1, \ldots, y'_{K-1}, y'_K$ are then output to dither subtractors $16_1, \ldots, 16_{K-1}, 16_K$ arranged to subtract respective dither $d_1, \ldots, d_{K-1}, d_K$ from the filtered received signals $y'_1, \ldots, y'_{K-1}, y'_K$ to output undithered filtered received signals $y'_1, \ldots, y'_{K-1}, y'_K$, which continue to be referred to with the same symbols here for simplicity. The undithered filtered received signals $y'_1, \ldots, y'_{K-1}, y'_K$ are then output to decoding stages $17_1, \ldots, 17_{K-1}, 17_K$ for decoding the undithered filtered received signals $y'_1, \ldots, y'_{K-1}, y'_K$ and to receiver quantising stages $18_1, \ldots, 18_{K-1}, 18_K$ for quantising the decoded signals by performing respective quantising operations mod $\Lambda_{S,1}, \ldots, \text{mod } \Lambda_{S,K-1}, \text{mod } \Lambda_{S,K}$ to output received codewords $\hat{c}_1, \ldots, \hat{c}_{K-1}, \hat{c}_K$ representing the data intended to be communicated to each of the respective receive antennas $5_1, 5_{K-1}, 5_K$.

The MIMO-BC 6 can be modelled by an equation $$y_t = Hx_t + z_t \quad (1)$$

where $t=1, \ldots, T-1$, T designates a discrete time index and T is a length of a block of time in the index; $y_t = [y_{t,1}, \ldots y_{t,(K-1)}, y_{t,K}]$ is an K×T vector representing signals received at the receive antennas $5_{1,1}, 5_{1, N-1}, 5_{1, N}, \ldots, 5_{K, N}$ over the MIMO-BC 6; $H = [H_1, \ldots, H_{K-1}, H_K]$ is an M×KT vector representing fading conditions in the MIMO-BC 6, with the (m,k)th element of H representing a fading coefficient between the mth transmit antenna $3_1, \ldots, 3_{M-1}, 3_M$ and the kth receive antenna $5_{1,1}, 5_{1, N-1}, 5_{1, N}, \ldots, 5_{K, N}$ (which fading coefficients are assumed to be independent and identically distributed (i.i.d.) under Rayleigh fading);

$$x_t = \sum_{m=1}^{M} x_{t,m}$$

is an M×T vector representing the supposition of the signals transmitted by the M transmit antennas $3_1, \ldots, 3_{M-1}, 3_M$; and $z_t = [z_{t,1}, \ldots, z_{t,K-1}, z_{t,K}]$ is a K×T vector representing noise present in the signals y received at the sets of receive antennas $5_{1,1}, 5_{1, N-1}, 5_{1, N}, \ldots, 5_{K, N}$ over the MIMO-BC 6, (which noise is assumed to be i.i.d. Gaussian noise and is represented as N (0,I) in FIG. 1). The transmitter 2 and receivers $4_1, \ldots, 4_{K-1}, 4_K$ process the signals on a block by block basis, with each block having duration T. As a consequence, the time dimension defined in equation 1 is ignored hereafter.

The sum rate capacity of the MIMO-BC 5 can be calculated from the following equation $$C_{BC} = \max_{\substack{S_x \geq 0 \\ tr(S_x) \leq P}} \min_{\substack{S_z \geq 0 \\ S_z(k,k) = I_N}} \log \frac{|HS_x H^H + S_z|}{S_z} \quad (2)$$

in which the input covariance $S_x$ and least-favourable Sato noise covariance $S_z$ define the saddle point. This is a max-min optimisation problem for the MIMO-BC 6. P indicates total power available at the transmit antennas $3_1, 3_{M-1}, 3_M$, which is constrained by the equation $$E\left[\frac{1}{T}\sum_{t=1}^{T} \|x_t^c\|_2^2\right] = \frac{1}{T}\sum_{t=1}^{T} tr(S_x^c) \leq P \quad (3)$$

where $S_x^c = E[x_t^c x_t^{cH}]$ for any time t is the spatial input covariance matrix. So, if the input covariance matrices for each receive antenna $5_1, 5_{K-1}, 5_K$ are $S_k^c = E[x_{t,k}^c x_{t,k}^{cH}]$ for $k=1, \ldots, K-1, K$, the power constraint can be rewritten $$\sum_{k=1}^{K} tr(S_k^c) \leq P \quad (4)$$

As a result of Langrangian duality, an optimisation problem for power allocation to signals to be transmitted over the MIMO-MAC 7 can be considered to be equivalent to the max-min optimisation problem for power allocation to signals $u_1, \ldots, u_{K-1}, u_K$ to be transmitted over the MIMO-BC 6 given in equation (2). This is described in more detail in the paper "Uplink-Downlink Duality Via Minimax Duality", Yu W., IEEE Trans. Inform. Theory, vol. 52, no. 2, pp. 361-374, February 2006. The input optimisation problem for power allocation to signals to be transmitted over the MIMO-MAC 7 can be solved considerably more easily than the min-max problem for power allocation to signals $u_1, \ldots, u_{K-1}, u_K$ to be transmitted over the MIMO-BC 6 given in equation (2), as the signals received over the MIMO-MAC 7 can be processed together by the transmitter 2, but the signals received over the MIMO-BC 5 must be processed independently by the receivers $4_1, 4_{K-1}, 4_K$.

The optimisation problem for power allocation to signals to be transmitted over the MIMO-MAC 7 reads $$\max_{\Gamma} \log|H^H \Gamma H + I| \quad (5)$$

subject to matrix $\Gamma$ being block diagonal, $tr(\Gamma) \leq P$, where P is total power, and $\Gamma \geq 0$; and where I is an identity matrix over time block T. The solution to equation (5) can be found using the non-linear Gauss-Seidal method (or block-coordinate ascent), as described in more detail in the publication "Non-linear Programming", Bertsekas D., Athena Scientific, Belmont, Mass., 1995 and the paper "Sum Power Iterative Water-Filling For Multi-Antenna Gaussian Broadcast Channels", Jindal N et al, IEEE Trans. Inform. Theory, 51(4), pages 1570-1580, April 2005. A matrix pair $(S_z, S_x)$ is then calculated using Karush-Kun-Tucker (KKT) conditions as $$\lambda S_x = I - (H^H \Gamma H + I)^{-1} \quad (6)$$

$$\lambda S_z + \gamma = H(H^H \Gamma H + I)^{-1} H^H \quad (7)$$

where $S_x$ is input covariance, $S_z$ is the least-favourable Sato noise covariance, $\gamma$ is a slack variable associated with the constraint $\Gamma \geq 0$, and $\lambda$ is a scaling factor, e.g. to compensate for any difference in total power available in the MIMO-MAC 7 and the MIMO-BC 6.

Assuming that the least-favourable Sato noise covariance $S_z$ is non-singular, equations (6) and (7) can be re-written as $$\Psi = S_z^{-1} - (HS_x H^H + S_z)^{-1} \quad (8)$$

$$\lambda J = H^H (HS_x H^H + S_z)^{-1} H \quad (9)$$

where $\Psi = \lambda \Gamma$.

For a Minimum-Mean Square Error Generalised Decision Feedback Equaliser (MMSE-GDFE) scheme, a Gaussian source u (equivalent to quantised signals $u_1, \ldots, u_{K-1}, u_K$ shown in FIG. 2) and beam forming matrix B are such that $E[uu^H] = I$ and $S_x = BB^H$. Hence, from an eigenvalue decomposition $S_x = V\Sigma V^H$, the beam forming matrix B is given by the equation $$B = V\Sigma^{1/2} M \quad (10)$$

where M is an arbitrary unitary matrix of the same dimension as input covariance $S_x$ and the beam forming matrix B. The MMSE estimation filter, which is equal to the covariance matrix of the estimation error $\bar{e}$ in the MMSE configuration is given by $$R_b = E[\bar{e}\,\bar{e}^H] = (B^H H^H S_z^{-1} HB + I)^{-1} \quad (11)$$
$$= (B^H H^H S_z^{-1} HB + I)^{-1}$$

The feedbackward and feedforward matrices $F_b$, $F_f$ are then obtained by calculating the Cholesky factorisation of $R_b$ and arranging it into block form, such that $R_b = G^{-1}\Delta^{-1}G^{-H}$, where G is upper uni-triangular. So, the feedbackward and feedforward matrices $F_b$, $F_f$ given by $$F_f = \Delta^{-1} G^{-H} B^H H^H S_z^{-1} \quad (12)$$

$$F_b = G \quad (13)$$

A decomposition and factorisation of (8) allows $\Psi$ to be re-written as $$\Psi = S_z^{-1} H S_x^{1/2} R^H R S_x^{H/2} H^H S_z^{-1} \quad (14)$$

and a full rank decomposition of $\Psi$ yields $$\Psi = \begin{pmatrix} T_{1,1}\Lambda_1^{1/2} & \cdots & 0 \\ \vdots & \ddots & \vdots \\ 0 & \cdots & T_{K,1}\Lambda_K^{1/2} \end{pmatrix} \begin{pmatrix} \Lambda_1^{1/2} T_{1,1}^H & \cdots & 0 \\ \vdots & \ddots & \vdots \\ 0 & \cdots & \Lambda_K^{1/2} T_{K,1}^H \end{pmatrix} \quad (15)$$

which allows definition of a unitary matrix U given by $$U = \begin{pmatrix} \Lambda_1^{-1/2} T_{1,1}^H & \cdots & 0 \\ \vdots & \ddots & \vdots \\ 0 & \cdots & \Lambda_K^{-1/2} T_{K,1}^H \end{pmatrix} S_z^{-1} H S_x^{1/2} R^H \quad (16)$$

Once the unitary matrix U has been calculated, the unitary matrix M that complies with the Cholesky decomposition can be derived. In other words, taking into account a permutation matrix $\Pi$ that defines an order in which the quantised signals $u_1, \ldots, u_{K-1}, u_K$ are filtered using a feedbackward filter $F_b$, the matrix product $M^H R^H U^H \Pi^T$ should be upper triangular. This can be achieved by computing a QR decomposition $$R^H U^H \Pi^T = M\Theta \quad (17)$$

where M is $r \times r$ unitary and $\Theta$ is upper triangular. Finally, the Cholesky decomposition of $R_b$ is written into block form such that $R_b = \Theta\Theta^H = G^{-1}\Delta^{-1}G^{-H}$, which yields block diagonal matrix $\Delta^{-1}$ and the feedback matrix component G, which is upper triangular.

This scheme is capable of achieving a sum-rate capacity given by $$C_{\pi(k)} = \frac{\left|H_{\pi(k)}\left(\sum_{i=1}^{k} S_{\pi(i)}\right)H_{\pi(k)}^H + I\right|}{\left|H_{\pi(k)}\left(\sum_{i=1}^{k-1} S_{\pi(i)}\right)H_{\pi(k)}^H + I\right|}, k = 1, \ldots, K \quad (18)$$

Where $\pi(k)$ is a selected encoding order. The above mathematics is elaborated in the paper "Achieving the Sum-rate Capacity of the MIMO Broadcast Channel with Veroni Codes and MMSE-GDFE Estimation", F. Tosato, Proc. 42nd Annu. Allerton Conf. on Communication, Control and Computing, Allerton House, Monticello, Ill., September 2005.

It is useful illustrate the scheme numerically. In this numerical illustration, the transmitter 2 is considered to have two transmit antennas $3_1$, $3_2$, and there are two receivers $4_1$, $4_2$ each having two receive antennas $5_{11}$, $5_{12}$, $5_{21}$, $5_{22}$. The total power available to the transmit antennas $3_1$, $3_2$, is set at 1 for simplicity. During the pilot sequence, each receiver $4_1$, $4_2$ measures fading in the MIMO-BC 6 as $$H_1 = \begin{pmatrix} 1 & 0.8 \\ 0.5 & 2 \end{pmatrix} \quad (19)$$
$$H_2 = \begin{pmatrix} 0.2 & 1 \\ 2 & 0.5 \end{pmatrix}$$

Hence, $H^T = [H_1^T H_2^T]$ is such that H has column rank $r = 2$. Using this channel matrix, the transmitter 2 first calculates the least favourable Sato noise covariance matrix $S_z$ by solving equation (5) and substituting the solution $\Gamma$ into equation (7). To solve equation (5) an iterative water filling algorithm is used with a sum power constraint, e.g. as described in the paper "Sum Power Iterative Water-Filling for Multi-Antenna Gaussian Broadcast Channels", Jindal, N et al, IEEE Trans. Inform. Theory, 51(4), 1570-1580, April 2005. The scalar $\lambda$ in equation (7) is the reciprocal of the maximum diagonal entry of $S_z^{(0)}$. The resulting covariance is $$S_z = \begin{pmatrix} 1 & 0 & 0.1332 & 0.4446 \\ 0 & 1 & 0.4478 & 0.0613 \\ 0.1332 & 0.4478 & 1 & 0 \\ 0.4446 & 0.0613 & 0 & 1 \end{pmatrix} \quad (20)$$

Then the transmitter calculates the water filling covariance matrix $S_x$ from the least favourable Sato noise covariance matrix $S_z$ using equation (6). This yields $$S_X = \begin{pmatrix} 0.4849 & 0.1157 \\ 0.1157 & 0.5151 \end{pmatrix} \quad (21)$$

Hence, the sum rate capacity $C_{BC}$ given by equation (2) is equal to 2.2615 nats/s.

Now, the transmitter 2 can derive the feedbackward and feedforward matrices $F_b$, $F_f$. The first step is to calculate the full rank decomposition $\Psi$ from equation (15), which yields $$\Psi = \begin{pmatrix} 0.0928 & 0.2353 & 0 & 0 \\ 0.2353 & 0.5968 & 0 & 0 \\ 0 & 0 & 0.0000 & 0.0034 \\ 0 & 0 & 0.0034 & 0.5983 \end{pmatrix} = \Phi\Phi^H \quad (22)$$

with $$\Phi^H = \begin{pmatrix} 0.8304 & 0 \\ 0 & 0.7735 \end{pmatrix} \begin{pmatrix} -0.3668 & -0.9303 & 0 & 0 \\ 0 & 0 & 0.0057 & 1.0000 \end{pmatrix} \quad (23)$$

So, the ranks associated with the two blocks of the full rank decomposition $\Psi$ are $r_1=r_2=1$. The unitary matrix U given by equation (16) is $$U = \begin{pmatrix} -0.5900 & -0.8074 \\ -0.8074 & 0.5900 \end{pmatrix} \quad (24)$$

As the unitary matrix M and the feedbackward and feedforward matrices $F_b$, $F_f$ depend on the encoding order, the next step is to fix a permutation vector. Here, we assume that a signal intended for the second receiver $4_2$ is encoded first, followed by the signal intended for the first receiver $4_1$. Thus, the permutation vector is $(\pi(1),\pi(2))=(1,2)$ and the corresponding permutation matrix is the identity $\Pi=I_2$. Then, equation (17) yields the unitary matrix M and the upper triangular matrix $\Theta$ $$M = \begin{pmatrix} -0.7535 & -0.6574 \\ -0.6574 & 0.7535 \end{pmatrix} \quad (25)$$

$$\Theta = \begin{pmatrix} 0.5571 & 0.2569 \\ 0 & 0.5794 \end{pmatrix}$$

This allows the transmitter to calculate the beamforming matrix B from equation (10), which yields $$B = \begin{pmatrix} 0.0099 & 0.6963 \\ -0.6958 & 0.1760 \end{pmatrix} = (B_1 B_2) \quad (26)$$

The optimum input covariances with the assumed encoding order are given read $$S_1 = \begin{pmatrix} 0.0001 & -0.0069 \\ -0.0069 & 0.4841 \end{pmatrix} \quad (27)$$

$$S_2 = \begin{pmatrix} 0.4849 & 0.1225 \\ 0.1225 & 0.0310 \end{pmatrix}$$

It follows from equation (18) that the rates achieved by the receivers $4_1$, $4_2$ are $$R_1 = \log|H_1 S_1 H_1^H + I| = 1.1699 \quad (28)$$

$$R_2 = \log\frac{|H_2 S_2 H_2^H + H_2 S_1 H_2^H + I|}{|H_2 S_1 H_2^H + I|} = 1.0916$$

These rates $R_1,R_2$ sum to $R_{BC}$ equal to 2.2615 nats/s. This rate $R_{BC}$ corresponds to one of the two corner points of the sum-rate capacity segment.

To determine the feedbackward and feedforward matrices $F_b$, $F_f$ the transmitter 2 arranges the Cholesky factorisation $R_b=\Theta\Theta^H$ into block form. In this case, as $r_1=r_2=1$, only the pivots of the Gauss elimination need to be extracted, which yields $$R_b = G^{-1}\Delta^{-1}G^{-H} = \begin{pmatrix} 1 & 0.4434 \\ 0 & 1 \end{pmatrix}\begin{pmatrix} 0.3104 & 0 \\ 0 & 0.3357 \end{pmatrix}\begin{pmatrix} 1 & 0 \\ 0.4434 & 1 \end{pmatrix} \quad (29)$$

From equations (12) and (13), the transmitter 2 can therefore calculate $$F_f = \begin{pmatrix} -0.1697 & -0.4304 & 0 & 0 \\ 0 & 0 & 0.0026 & 0.4481 \end{pmatrix} \quad (30)$$

$$F_b = \begin{pmatrix} 1 & -4434 \\ 0 & 1 \end{pmatrix}$$

So, the feedforward filters $F_{f,1}$, $F_{f,2}$ for each of the two receivers $4_1$, $4_2$ are $$F_{f,1}=(-0.1697\ -0.4304)$$

$$F_{f,2}=(0.0026\ 0.4481) \quad (31)$$

Figure 3:
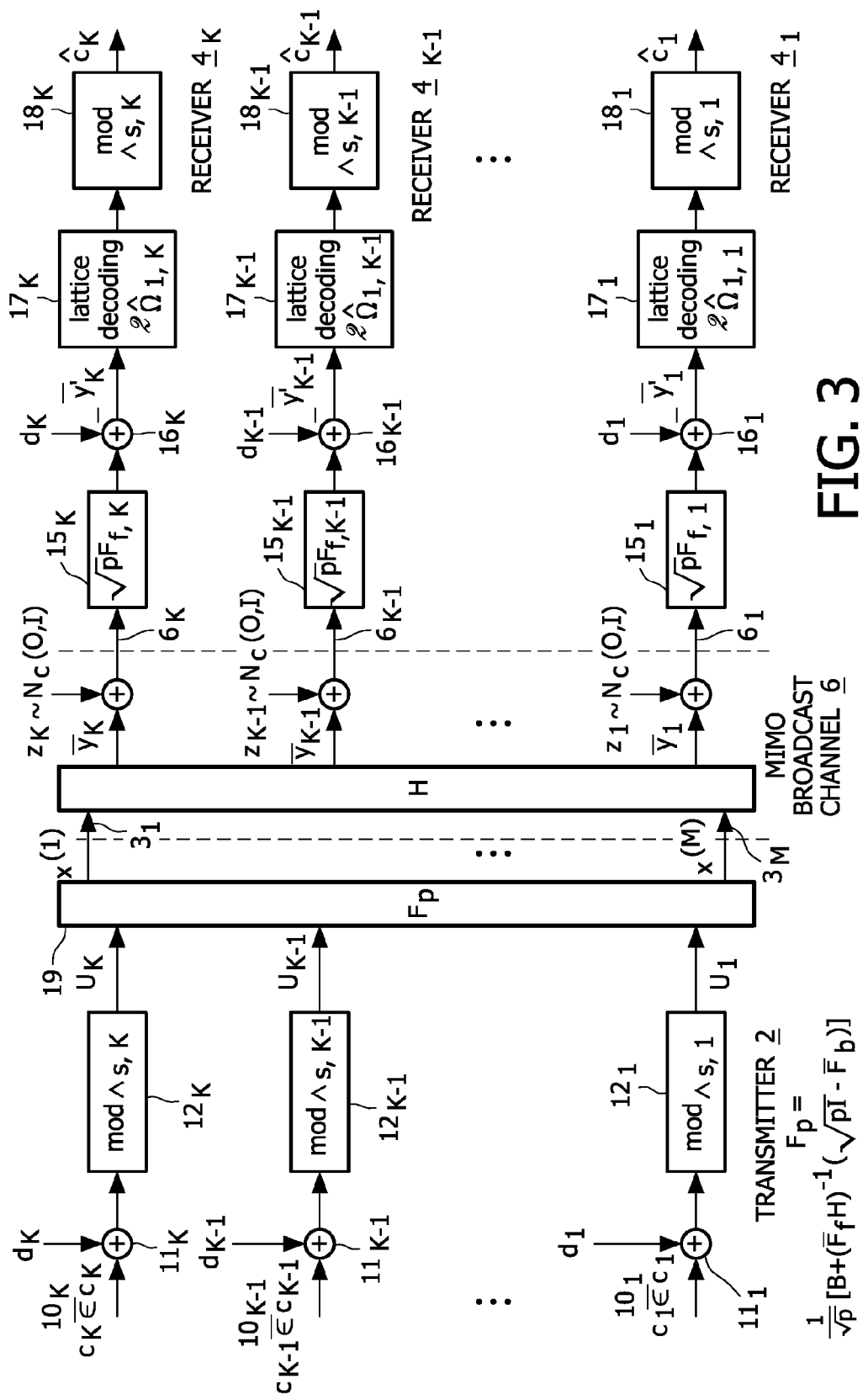
FIG. 3 is a schematic illustration of transmission over a MIMO-BC of the communication system illustrated in FIG. 1 in accordance with a second embodiment of the present invention.

The first preferred embodiment of the invention described above has a non-linear encoding scheme. However, it is possible to implement the invention with a linear encoding scheme. A second preferred embodiment of the invention illustrates this. Referring to FIG. 3, the second preferred embodiment of the invention is similar to the first preferred embodiment of the invention in most respects and similar components are referred to with the same symbols in the text and the same reference numerals in text and drawings. Importantly, it can be seen that the transmitter 2 of the second preferred embodiment of the invention has a precoding block 19 in place of the beamforming stage 13 of the first preferred embodiment of the invention. It can also be seen that the feedbackward filter stages $14_1, \ldots, 14_{K-1}, 14_K$ are omitted. The precoding block 19 applies a single precoding filter $F_p$ for performing both co-signal interference compensation and power allocation to the quantised signals $u_1, \ldots, u_{K-1}, u_K$ in place of the separate feedbackward matrix $F_b$ and beamforming matrix B of the non-linear implementation.

Ideally, the precoding filter $F_p$ should be defined by the equation $$\tilde{F}_p = B = (F_f H)^{-1}(I - F_b) \quad (32)$$

to achieve the same sum-rate capacity as achieved in the first preferred embodiment of the invention using an equivalent non-linear encoding scheme. However, the linear encoding scheme of the second preferred embodiment of the invention cannot achieve this sum-rate capacity $C_{BC}$ without exceeding the total available transmit power P. Indeed, it can be shown that the total available transmit power P is exceeded by an excess power constant $\rho$ given by the equation $$\rho = \frac{tr(\tilde{F}_p \tilde{F}_p^H)}{P} \geq 1 \quad (33)$$

using a precoding filter $F_p$ as defined by equation (32). Hence, the precoding filter $F_p$ is adapted to normalise the power of the signals $x_1, \ldots, x_{K-1}, x_K$ transmitted by the transmit antennas $3_1, 3_{M-1}, 3_M$ using the excess power constant $\rho$ given by equation (33). More specifically, the precoding filter $F_p$ is defined by the equation $$F_p = \frac{1}{\sqrt{\rho}}[B + (\bar{F}_f H)^{-1}(\sqrt{\rho} I - \bar{F}_b)] \quad (34)$$

$$= \frac{1}{\sqrt{\rho}} \tilde{F}_p$$

where $\bar{F}_f = \sqrt{\rho} F_f$ and $\bar{F}_b = \sqrt{\rho} F_b$.

This power normalisation has the effect of increasing effective noise, which reduces the achievable sum-rate capacity to below that achieved in the first embodiment of the invention. However, as the precoding filter $F_p$ depends on the feedbackward and feedforward filters $F_b$, $F_f$, which in turn depend on the order in which the codewords $c_1, \ldots, c_{K-1}, c_K$ are encoded, the signal coded using the last encoded codeword $c_1$ is communicated to the respective receiver $4_1$ with substantially zero interference and the signals coded using the successively encoded codewords $c_1, \ldots, c_{K-1}, c_K$ are communicated to the respective receivers $4_1, \ldots, 4_{K-1}, 4_K$ with increasing interference from the signals of the later encoded codewords $c_1, \ldots, c_{K-1}, c_K$ with the last encoded codeword $c_K$ being communicated to the last receiver $4_K$ with the most interference.

It is interesting to compare the sum-rate capacities achievable by the communication systems 1 of the first and second embodiments of the invention. Referring to FIG. 4, an average of the sum-rate capacity $C_{BC}$, in nats per channel use, achieved by the communication systems 1 of the first embodiment of the invention and the second embodiment of the invention are shown for different numbers K of receivers $4_1, \ldots, 4_{K-1}, 4_K$. The results are calculated assuming the transmitter 2 has two transmit antennas $3_1, 3_2$ and each receiver $4_1, 4_{K-1}, 4_K$ has one receive antenna $5_{1,1}, 5_{K-1,1}, 5_{K,1}$. The solid lines 20 represent the sum rate capacity $C_{BC}$ achieved by the communication system 1 of the first embodiment of the invention and the dashed lines 21 represent the sum rate capacity $C_{BC}$ achieved by the communication system 1 of the second embodiment of the invention. The upper solid line and upper dashed line show the achieved sum rate capacities $C_{BC}$ for communication systems 1 having 40 receivers $4_1, \ldots, 4_{K-1}, 4_K$; the middle solid line and middle dashed line show the achieved sum-rate capacities $C_{BC}$ for communication systems 1 having 20 receivers $4_1, \ldots, 4_{K-1}, 4_K$; and the lower solid line and lower dashed line show the achieved sum rate capacities $C_{BC}$ for communication systems 1 having 20 receivers $4_1, \ldots, 4_{K-1}, 4_K$, as indicated in the FIG. 4 by the arrows K=40, K=20 and K=10 respectively.

Interestingly, the sum-rate capacities $C_{BC}$ achieved by the communication system 1 of the first embodiment of the invention are only marginally lower than the sum-rate capacities $C_{BC}$ achieved by the communication system 1 of the second embodiment of the invention. This shows that, whilst the precoding filter $F_p$ produced sub-optimal sum-rate capacities $C_{BC}$, these capacities $C_{BC}$ are likely to be sufficient for many applications. So, the reduced complexity of the transmitter 2 of the communication system 1 of the second embodiment of the invention may make it preferable for many such applications.

Referring to FIG. 5, the sum rate capacity per transmit antenna $3_1, \ldots, 3_{M-1}, 3_M$ in bits per channel use, achieved by the communication systems 1 of the first embodiment of the invention and the second embodiment of the invention are shown for different numbers M=2, 3, 4 and 8 of transmit antennas $3_1, \ldots, 3_{M-1}, 3_M$. The results are calculated assuming that the communication systems 1 have 20 receivers $4_1, \ldots, 4_{K-1}, 4_K$. The solid lines 22 represent the sum rate capacity per transmit antenna $3_1, \ldots, 3_{M-1}, 3_M$ achieved by the communication system 1 of the first embodiment of the invention and the dashed lines 23 represent the sum rate capacity per transmit antenna $3_1, \ldots, 3_{M-1}, 3_M$ achieved by the communication system 1 of the second embodiment of the invention. As indicated in the FIG. 5 by the arrow A, the sum rate capacity per transmit antenna $3_1, \ldots, 3_{M-1}, 3_M$ achieved by the communication system 1 of the first embodiment of the invention increases slightly with the number M of transmit antennas $3_1, \ldots, 3_{M-1}, 3_M$. Conversely, as indicated by arrow B in FIG. 5, the sum rate capacity per transmit antenna $3_1, \ldots, 3_{M-1}, 3_M$ achieved by the communication system 1 of the second embodiment of the invention decreases with the number M of transmit antennas $3_1, \ldots, 3_{M-1}, 3_M$. This results from increases in the dimensions of the feedforward filter $F_f$ and a larger excess power constant $\rho$.

Of course, the described embodiments of the invention are only examples of how the invention may be implemented. Other modifications, variations and changes to the described embodiments will also occur to those having appropriate skills and knowledge. These modifications, variations and changes may be made without departure from the spirit and scope of the invention defined in the claims and its equivalents.

In the present specification and claims the word "a" or "an" preceding an element does not exclude the presence of a plurality of such elements. Further, the word "comprising" does not exclude the presence of other elements or steps than those listed.

The invention claimed is:

1. A transmitter (2) having multiple transmit antennas ($3_1$, $3_{M-1}, 3_M$) for transmission over a communication channel (6) to receivers ($4_1, 4_{K-1}, 4_K$) each having one or more receive antennas ($5_{1,1}, 5_{K-1,N-1}, 5_{K,N}$), the transmitter (2) comprising:
    means (9) for estimating channel conditions for the channel (6);
    a feedbackward filter stage ($14_1, 14_{K-1}$) for filtering signals representing data intended to be communicated to respective receivers ($4_1, 4_{K-1}, 4_K$) with a feedbackward filter before transmission over the channel (6) to compensate for expected co-signal interference in the channel (6);
    a beamforming stage (13) for allocating powers at which the filtered signals are combined at each transmit antenna ($3_1, 3_{M-1}, 3_M$) for transmission over the channel (6);
    means (8) for transmitting information representing a feedforward filter to one of the receivers ($4_1, 4_{K-1}, 4_K$) for application to a signal received over the channel (6) at one or more receive antennas ($5_{1,1}, 5_{K-1,N-1}, 5_{K,N}$) of that receiver ($4_1, 4_{K-1}, 4_K$) to extract from the received signal a signal representing the data intended to be communicated to that receiver ($4_1, 4_{K-1}, 4_K$) without knowledge of the signal or signals received over the channel (6) at the receive antenna(s) ($5_{1,1}, 5_{K-1,N-1}, 5_{K,N}$) of the other receiver(s) ($4_1, 4_{K-1}, 4_K$); and
    means (9) for determining the feedbackward filter, power allocation and feedforward filter based on the estimated channel conditions for the channel (6).

2. The transmitter (2) of claim 1, wherein a combination of the feedbackward and feedforward filters is substantially equivalent to a single filter for extracting the signal representing the data intended to be communicated to the receiver ($4_1$, $4_{K-1}$, $4_K$) with a minimum mean squared error under the estimated channel conditions.

3. The transmitter (2) of claim 1, comprising means (8) for transmitting a pilot sequence to the receivers ($4_1$, $4_{K-1}$, $4_K$) and means (8) for receiving an indication of the channel conditions for the channel (6) from the receivers ($4_1$, $4_{K-1}$, $4_K$) based on the pilot bits, wherein the means (9) for estimating the channel conditions for the channel (6) bases the estimate on the received indication.

4. The transmitter (2) of claim 3, wherein the feedbackward filter, power allocation and feedforward filter are based on a solution to an optimisation problem for maximising the overall capacity of the channel (6) under the estimated channel conditions for a given total power constraint.

5. The transmitter (2) of claim 4, wherein the means (9) for determining the feedbackward filter, power allocation and feedforward filter determines the feedbackward filter, power allocation and feedforward filter by solving the optimisation problem.

6. The transmitter (2) of claim 5, wherein the means (9) for determining the feedbackward filter, power allocation and feedforward filter determines the feedbackward filter, power allocation and feedforward filter by deriving an input covariance and least favourable noise covariance for the channel (6) based on the solved input optimisation problem.

7. The transmitter (2) of claim 5, wherein the means (9) for determining the feedbackward filter, power allocation and feedforward filter determines the feedbackward filter, power allocation and feedforward filter by deriving an estimation filter that can be factorised to provide the feedbackward filter and feedforward filter.

8. The transmitter (2) of claim 1, wherein the means (9) for estimating the channel conditions estimates the channel conditions based on the channel conditions of a return channel (7) from the receive antennas ($5_{1,1}$, $5_{K-1, N-1}$, $5_{K, N}$) of the receivers ($4_1$, $4_{K-1}$, $4_K$) to the transmit antennas ($3_1$, $3_{M-1}$, $3_M$) of the transmitter (2).

9. The transmitter (8) of claim 4, wherein the feedbackward filter, power allocation and feedforward filter are based on a solution to an optimisation problem for maximising the overall capacity of the return channel (7).

10. The transmitter (2) of claim 1, wherein the feedbackward filter can be arranged as a uni-triangular matrix with respect to a column of the signals representing the data intended to be communicated to the one receiver ($4_1$, $4_{K-1}$, $4_K$).

11. The transmitter (2) of claim 1, wherein feedforward filter can be arranged as a block diagonal matrix with respect to a column of the signal received by the one receiver ($4_1$, $4_{K-1}$, $4_K$).

12. The transmitter (2) of claim 1, wherein the feedbackward filter and power allocation are each applied to blocks of symbols of the signals representing the data intended to be communicated to the respective receivers ($4_1$, $4_{K-1}$, $4_K$) on a block by block basis.

13. The transmitter (2) of claim 1, comprising an encoder ($10_1$, $10_{K-1}$, $10_K$) for encoding the data intended to be communicated to the receivers ($4_1$, $4_{K-1}$, $4_K$) to output the signals for filtering by the feedbackward filter.

14. The transmitter (2) of claim 13, wherein the encoder ($10_1$, $10_{K-1}$, $10_K$) encodes the data by selecting a codeword of a nested lattice code.

15. The transmitter (2) of claim 14, comprising a quantisation stage ($12_1$, $12_{K-1}$, $12_K$) for quantising the selected codewords using a shaping lattice of the nested lattice code.

16. The transmitter (2) of claim 14, comprising a dither adder ($11_1$, $11_{K-1}$, $11_K$) for applying dither to the selected codewords.

17. The transmitter (2) of claim 13, wherein the encoder ($10_1$, $10_{K-1}$, $10_K$) encodes the signals in a selected order.

18. The transmitter (2) of claim 17, comprising means ($11_1$, $11_{K-1}$) for subtracting signals encoded earlier in the order from a given encoded signal and wherein the feedbackward filter stage ($14_1$, $14_{K-1}$) filters the earlier encoded signals before the subtraction.

19. The transmitter (2) of claim 13, comprising means (9) for choosing an order in which to encode signals to be communicated to the receivers ($4_1$, $4_{K-1}$, $4_K$).

20. The transmitter (2) of claim 1, wherein the feedbackward filter stage ($14_1$, $14_{K-1}$) and beamforming stage (13) comprise a single precoding filter stage (19) for applying a precoding filter to the signals representing the data intended to be communicated to the receivers ($4_1$, $4_{K-1}$, $4_K$).

21. The transmitter (2) of claim 20, wherein the precoding filter applied by the precoding filter stage (19) is a normalisation of the feedbackward filter to a total power of the transmit antennas ($3_1$, $3_{M-1}$, $3_M$).

22. The transmitter (2) of claim 1, comprising a selector (9) for selecting receivers ($4_1$, $4_{K-1}$, $4_K$) to which to communicate signals.

23. The transmitter (2) of claim 22, wherein the selector (9) optimises sum rate capacity of a return channel (7) from the receive antennas ($5_{1,1}$, $5_{K-1, N-1}$, $5_{K, N}$) to the transmit antennas ($3_1$, $3_{M-1}$, $3_M$), identifies receive antennas ($5_{1,1}$, $5_{K-1, N-1}$, $5_{K, N}$) to which substantially zero capacity is allocated in the return channel (7) as a result of the optimisation; and selects to transmit signals over the communication channel (6) from the transmit antennas ($3_1$, $3_{M-1}$, $3_M$) to the receive antennas ($5_{1,1}$, $5_{K-1, N-1}$, $5_{K, N}$) only to receivers ($4_1$, $4_{K-1}$, $4_K$) having a receive antenna ($5_{1,1}$, $5_{K-1, N-1}$, $5_{K, N}$) that is not identified as allocated substantially zero capacity in the return channel (7).

24. The transmitter (2) of claim 23, wherein the selector (9) alters the optimisation to exclude one or more receive antennas ($5_{1,1}$, $5_{K-1, N-1}$, $5_{K, N}$).

25. The transmitter (2) of claim 23, wherein the selector (9) scales values in a representation of the channel conditions used in the optimisation for one or more receive antennas ($5_{1,1}$, $5_{K-1, N-1}$, $5_{K, N}$) to reduce the probability its/their receiver(s) ($4_1$, $4_{K-1}$, $4_K$) are selected for transmission of signals over the communication channel (6) from the transmit antennas ($3_1$, $3_{M-1}$, $3_M$) to the receive antennas ($5_{1,1}$, $5_{K-1, N-1}$, $5_{K, N}$).

26. The transmitter (2) of claim 23, wherein the selector (9) normalises a representation of the channel conditions used in the optimisation.

27. A communication system (1) incorporating the transmitter (2) of claim 1.

28. A transmitter (2) having multiple transmit antennas ($3_1$, $3_{M-1}$, $3_M$) for transmission over a communication channel (6) to receivers ($4_1$, $4_{K-1}$, $4_K$) each having one or more receive antennas ($5_{1,1}$, $5_{K-1, N-1}$, $5_{K, N}$), the transmitter (2) having a selector (9) for optimising sum rate capacity of a return channel (7) from the receive antennas ($5_{1,1}$, $5_{K-1, N-1}$, $5_{K, N}$) to the transmit antennas ($3_1$, $3_{M-1}$, $3_M$), identifying receive antennas ($5_{1,1}$, $5_{K-1, N-1}$, $5_{K, N}$) to which substantially zero capacity is allocated in the return channel (7) as a result of the optimisation; and selecting to transmit signals over the communication channel (6) from the transmit antennas ($3_1$, $3_{M-1}$, $3_M$) to the receive antennas ($5_{1,1}$, $5_{K-1, N-1}$, $5_{K, N}$) only to receivers ($4_1$, $4_{K-1}$, $4_K$) having a receive antenna ($5_{1,1}$, $5_{K-1, N-1}$, $5_{K, N}$) that is not identified as allocated substantially zero capacity in the return channel (7).

29. A method of transmission over a communication channel (6) from a transmitter (2) having multiple transmit antennas (3$_1$, 3$_{M-1}$, 3$_M$) to receivers (4$_1$, 4$_{K-1}$, 4$_K$) each having one or more receive antennas (5$_{1,1}$, 5$_{K-1, N-1}$, 5$_{K, N}$), the method comprising:

estimating channel conditions for the channel (6);

filtering signals representing data intended to be communicated to respective receivers (4$_1$, 4$_{K-1}$, 4$_K$) with a feedbackward filter before transmission over the channel (6) to compensate for expected co-signal interference in the channel (6);

allocating powers at which the filtered signals are combined at each transmit antenna (3$_1$, 3$_{M-1}$, 3$_M$) for transmission over the channel (6);

transmitting information representing a feedforward filter to one of the receivers (4$_1$, 4$_{K-1}$, 4$_K$) for application to a signal received over the channel (6) at one or more receive antenna (5$_{1,1}$, 5$_{K-1, N-1}$, 5$_{K, N}$) of that receiver (4$_1$, 4$_{K-1}$, 4$_K$) to extract from the received signal a signal representing the data intended to be communicated to that receiver (4$_1$, 4$_{K-1}$, 4$_K$) without knowledge of the signal or signals received over the channel (6) at the receive antenna(s) (5$_{1,1}$, 5$_{K-1, N-1}$, 5$_{K, N}$) of the other receiver(s) (4$_1$, 4$_{K-1}$, 4$_K$); and determining the feedbackward filter, power allocation and feedforward filter based on the estimated channel conditions for the channel.

30. A nontransitory computer readable storage medium containing computer program code adapted to carry out the method of claim 29 when processed by computer processing means.

* * * * *